US012636936B2

(12) United States Patent
Hofmanninger et al.

(10) Patent No.: US 12,636,936 B2
(45) Date of Patent: May 26, 2026

(54) TEMPERATURE CONTROL DEVICE FOR A MOTOR VEHICLE

(71) Applicant: Bayerische Motoren Werke Aktiengesellschaft, Munich (DE)

(72) Inventors: Stefan Hofmanninger, Weibern (AT); Alexander Lichtenberger, St. Peter in der Au (AT); Rene Pichlbauer, Sankt Marien (AT); Andreas Siuka, Kematen an der Krems (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 101 days.

(21) Appl. No.: 18/686,710

(22) PCT Filed: Sep. 14, 2022

(86) PCT No.: PCT/EP2022/075473
§ 371 (c)(1),
(2) Date: Feb. 26, 2024

(87) PCT Pub. No.: WO2023/061686
PCT Pub. Date: Apr. 20, 2023

(65) Prior Publication Data
US 2024/0351396 A1 Oct. 24, 2024

(30) Foreign Application Priority Data
Oct. 13, 2021 (DE) ..................... 10 2021 126 454.5

(51) Int. Cl.
B60H 1/00 (2006.01)
(52) U.S. Cl.
CPC ..... B60H 1/00885 (2013.01); B60H 1/00278 (2013.01); B60H 2001/00307 (2013.01)

(58) Field of Classification Search
CPC ............ B60H 1/00278; B60H 1/00885; B60H 2001/00307
See application file for complete search history.

(56) References Cited

U.S. PATENT DOCUMENTS

| | | |
|---|---|---|
| 2019/0070924 A1 | 3/2019 | Mancini et al. |
| 2020/0276882 A1 | 9/2020 | Allgaeuer et al. |
| 2021/0129627 A1 | 5/2021 | Kim |

FOREIGN PATENT DOCUMENTS

| | | |
|---|---|---|
| DE | 10 2011 016 070 A1 | 10/2012 |
| DE | 10 2017 220 376 A1 | 5/2019 |

(Continued)

OTHER PUBLICATIONS

International Search Report (PCT/ISA/210) issued in PCT Application No. PCT/EP2022/075473 dated Jan. 13, 2023 with English translation (5 pages).

(Continued)

*Primary Examiner* — Jonathan Bradford
(74) *Attorney, Agent, or Firm* — Crowell & Moring LLP

(57) ABSTRACT

A temperature control device for a motor vehicle, with a first and second temperature control circuit through which temperature control fluid can flow, a drive machine arranged in the first control circuit, a first pump arranged in the first control circuit to convey the fluid through the first control circuit, an electrical energy store for storing electrical energy, arranged in the second control circuit and temperature-controlled by the fluid flowing through the second control circuit, and a second pump in the second temperature control circuit to convey the fluid through the second temperature control circuit, the pump including a valve device which is switchable.

14 Claims, 7 Drawing Sheets

(56)         References Cited

FOREIGN PATENT DOCUMENTS

| | | |
|---|---|---|
| DE | 10 2018 112 108 A1 | 11/2019 |
| DE | 10 2019 132 688 A1 | 6/2020 |
| DE | 10 2019 210 029 A1 | 1/2021 |
| DE | 10 2020 119 339 A1 | 5/2021 |
| WO | WO 2021/122949 A1 | 6/2021 |

OTHER PUBLICATIONS

German-language Written Opinion (PCT/ISA/237) issued in PCT Application No. PCT/EP2022/075473 dated Jan. 13, 2023 with English translation (9 pages).
German-language Search Report issued in German Application No. 10 2021 126 454.5 dated Jun. 1, 2024, with partial English translation (14 pages).

TEMPERATURE CONTROL DEVICE FOR A MOTOR VEHICLE

BACKGROUND AND SUMMARY

The invention relates to a temperature control device for a motor vehicle, in particular for a motor car. Furthermore, the invention relates to a motor vehicle, in particular a motor car.

A cooling system for a motor vehicle can be gathered as known from DE 10 2017 220 376 A1, with an electrical energy store for driving the motor vehicle. Furthermore, DE 10 2019 132 688 A1 discloses a heat management system for a motor vehicle, with a motor/chiller circuit, in which a chiller, an electrical energy store and an electric motor are arranged.

It is an object of the present invention to provide a temperature control device for a motor vehicle, and a motor vehicle, with the result that particularly advantageous temperature control can be provided.

According to the invention, this object is achieved by way of a temperature control device with the features disclosed herein, by way of a temperature control device with the features disclosed herein, and by way of a motor vehicle with the features disclosed herein. Advantageous refinements of the invention are also the subject matter of the present disclosure.

A first aspect of the invention relates to a temperature control device for a motor vehicle, in particular for a motor car which is preferably configured as a passenger motor car. This means that the motor vehicle which is preferably configured as a motor car, in particular as a passenger motor car, has the temperature control device in its completely produced state. In particular, a particularly advantageous temperature control, that is to say cooling and/or heating, of the interior space (also called a passenger cell or passenger compartment) of the motor vehicle can be realized by the temperature control device, in the interior space of which motor vehicle persons such as, for example, the driver of the motor vehicle can be accommodated during a journey of the motor vehicle. The temperature control device has a first temperature control loop which is also simply called a first circuit or a first temperature control circuit. The first temperature control circuit can be flowed through by a temperature control fluid which is preferably a liquid. For example, the temperature control fluid can have at least, in particular at least predominantly, water. The temperature control device has at least one drive unit, by which the motor vehicle can be driven. The drive unit is arranged in the first temperature control circuit and, as a result, can be temperature controlled, that is to say can be cooled and/or can be heated, by the temperature control fluid which flows through the first temperature control circuit. For example, the temperature control fluid which flows through the first temperature control circuit can flow at least through a part of the drive unit, as a result of which the drive unit can be temperature controlled, that is to say cooled and/or heated, in particular by way of a heat exchange between the temperature control fluid which flows through the first temperature control circuit and the drive unit. The drive unit is preferably an electric machine which can be driven, for example, in a motor mode and therefore as an electric motor and by which the motor vehicle can be driven electrically, in particular purely electrically. The drive unit, in particular the electric machine, is very preferably a high voltage component, the electrical voltage of which, in particular the electrical operating or nominal voltage of which, is preferably greater than 50 volts, in particular greater than 60 volts, and very preferably is several hundred volts. As a result, particularly great electrical power outputs can be provided for driving the motor vehicle electrically, in particular purely electrically.

Moreover, the temperature control device comprises a first pump which is arranged in the first temperature control circuit and by which the temperature control fluid can be conveyed through the first temperature control circuit. Moreover, the temperature control device has a second temperature control circuit which can be flowed through by the temperature control fluid. Furthermore, the temperature control device comprises an electrical energy store, by which electrical energy can be stored or is stored. The electrical energy store is arranged in the second temperature control circuit and, as a result, can be temperature controlled, that is to say can be cooled and/or can be heated, by the temperature control fluid which flows through the second temperature control circuit. For example, the temperature control fluid which flows through the second temperature control circuit can flow at least through a part of the electrical energy store. As a result, the electrical energy store can be temperature controlled by the temperature control fluid which flows through the second temperature control circuit, in particular by way of a heat exchange between the temperature control fluid which flows through the second temperature control circuit and the electrical energy store. The second temperature control loop is also called the second temperature control circuit or second circuit. The first temperature control circuit is also called the first circuit, and the second temperature control circuit is also called the second circuit. The electrical energy store is preferably a high voltage component, the electrical voltage of which, in particular the electrical operating or nominal voltage of which, is preferably greater than 50 volts, in particular is greater than 60 volts, and very preferably is several hundred volts. In particular, it is conceivable that the electric machine can be supplied with the electrical energy which is stored in the energy store, as a result of which the electric machine can be operated in the motor mode.

Moreover, the temperature control device comprises a second pump which is arranged in the second temperature control circuit and is provided in addition to the first pump. This means that the second pump is a component which is provided in addition to the first pump and is external with regard to the first pump. Conversely, the first pump is a component which is provided in addition to the second pump and is external with regard to the second pump. The first pump and/or the second pump are/is preferably an electric pump, that is to say an electrically operable pump. By the second pump, the temperature control fluid can be conveyed through the second temperature control circuit.

In order for it now to be possible for particularly advantageous temperature control, in particular of the interior space of the motor vehicle, to be realized, the temperature control device has according to the invention a valve device which can be switched over between a first switching state and a second switching state. In the first switching state, the pumps are connected in series to one another, in particular in the flow direction of the temperature control fluid which flows through the temperature control circuits. In other words, in the first switching state, the pumps are arranged or connected in series to one another in terms of flow, with the result that, on its path through the temperature control circuits or at least through respective regions of the temperature control circuits, the temperature control fluid first of all flows through one of the pumps and thereupon through the other pump. It is provided, in particular, that, in the first switching state of the valve device which is also called a first valve device, the temperature control circuits are coupled or connected to one another, in particular fluidically, via or by the valve device in such a way that the pumps are connected in series to one another, with the result that, in particular when the temperature control fluid is conveyed by at least one of the pumps or by the two pumps, this temperature control fluid first of all flows through the one pump and then or thereupon through the other pump.

In the second switching state, the pumps are connected in parallel to one another, in particular in the flow direction of the temperature control fluid which flows through the temperature control circuits. In other words, in the second switching state, the pumps are arranged or connected in parallel to one another in terms of flow. Therefore, for example, if the temperature control fluid is conveyed by the first pump through the first temperature control circuit and by the second pump through the second temperature control circuit while the valve device is situated in the second switching state, the temperature control fluid which flows through the first temperature control circuit flows through the first pump and, in particular at the same time, the temperature control fluid which flows through the second temperature control circuit flows through the second pump, in particular, in parallel or at the same time. Once again in other words, for example, the temperature control circuits are disconnected from one another by the valve device in the second switching state, at least in such a way that, in the second switching state, the pumps are not connected in series, but rather in parallel to one another. In the first switching state, the temperature control circuits or the abovementioned regions, in which the pumps are arranged, for example, are connected in series to one another by the valve device. In the second switching state, however, the temperature control circuits or the regions of the temperature control circuits are connected in parallel to one another, in particular by the valve device. The valve device and its switching states make particularly needs-based and advantageous guiding or routing of the temperature control fluid possible, with the result that, for example, heat which is contained in the temperature control fluid and is transferred, for example, from the electrical energy store and/or from the drive unit to the temperature control fluid can be utilized in a needs-based and advantageous manner, in particular in order, for example, to control the temperature of the interior space of the motor vehicle, in particular in order to heat it. Moreover, it is one particularly great advantage that, in the first switching state in which the pumps are connected in series to one another, the two pumps can convey the temperature control fluid, in particular through temperature control circuits or at least through the respective regions of the temperature control circuits. As a result, in each case considered on their own, the pumps can be configured so as to be favorable in terms of installation space, weight and cost, in particular in comparison with a use of precisely one pump instead of the two pumps, since the precisely one pump would then have to be configured to be able to convey the temperature control fluid through the two temperature control circuits, in particular at the same time. Therefore, the costs, the installation space requirement and the weight of the temperature control device can be kept within a particularly low scope. In order for it to be possible for particularly advantageous temperature control to be realized in a way which is particularly favorable in terms of weight, installation space and cost, it is provided in the case of one embodiment of the invention that the valve device is arranged upstream of the first pump in the first temperature control circuit and upstream of the second pump in the second temperature control circuit in the flow direction of the temperature control fluid which flows through the temperature control circuits. A further embodiment is distinguished by a second valve device which is preferably provided in addition to the first valve device. It is therefore preferably provided that the second valve device is a component which is provided in addition to the first valve device and is external with regard to the first valve device, it preferably being provided conversely that the first valve device is a component which is provided in addition to the second valve device and is provided with regard to the second valve device. The second valve device can be switched over between a third switching state and a fourth switching state. In a third switching state, the temperature control fluid which flows through the drive unit and therefore comes from the drive unit and flows toward the second valve device and flows through the second valve device is arranged by the second valve device in a first part region, arranged downstream of the second valve device, of the first temperature control circuit, it being possible, for example, for the first part region to be a first one of the abovementioned regions of the temperature control circuits. In the fourth switching state, the temperature control fluid which flows through the drive unit and therefore comes from the drive unit and, in particular, flows through the second valve device can be introduced by the second valve device into a second part region, arranged downstream of the second valve device, of the second temperature control circuit and, as a result, into the second temperature control circuit, it being possible, for example, for the second part region to be the second region of the temperature control circuits. As a result, needs-based guiding or routing of the temperature control fluid can be provided in a simple way, with the result that heat which is contained in the temperature control fluid can be utilized in a particularly simple and needs-based way, in order, for example, to control the temperature of the interior space of the motor vehicle.

Within the context of the present disclosure, the fact that the temperature control fluid flows through the respective temperature control circuit and, as a consequence, the respective temperature control circuit can be flowed through or is flowed through by the temperature control fluid can be understood to mean, in particular, that the temperature control fluid flows at least through a part of the respective temperature control circuit and therefore, for example, at least through the respective part region of the respective temperature control circuit.

In order for it to be possible for particularly advantageous temperature control of the motor vehicle, in particular of the interior space of the motor vehicle, to be realized, an air conditioning device which is configured to control the temperature of air which is to be fed to the interior space of the motor vehicle is provided in the case of a further embodiment of the invention. The interior space can be temperature controlled, that is to say can be cooled and/or heated, by way of the temperature control, in particular cooling and/or heating, of the air which is to be fed to the interior space. The air conditioning device has a refrigerant circuit which is provided in addition to the temperature control circuits and can be flowed through by a refrigerant. The refrigerant is preferably provided in addition to the temperature control fluid, and is a fluid which is different than the temperature control fluid. Furthermore, it is preferably provided that the refrigerant circuit is disconnected fluidically from the first temperature control circuit and/or the second temperature control circuit.

Moreover, the air conditioning device has at least one heat exchanger which is also called a chiller. The heat exchanger is arranged both in the refrigerant circuit and in the second temperature control circuit, with the result that the heat exchanger can be flowed through both by the refrigerant and by the temperature control fluid which flows through the second temperature control circuit. Therefore, heat can be transferred or exchanged via the heat exchanger between the refrigerant and the temperature control fluid which flows through the second temperature control circuit. In particular, it is conceivable, for example, that heat which is contained in the temperature control fluid passes via the heat exchanger to the refrigerant which flows through the refrigerant circuit, as a result of which the temperature control fluid is cooled. The heat which is transferred to the refrigerant and is therefore contained in the refrigerant can be utilized, for example, in order to heat the air which is to be fed to the interior space, as a result of which the interior space can be warmed or heated. As a result, temperature control can be provided which is particularly energy-efficient and, as a result of the use of the first valve device, is favorable in terms of cost, weight and installation space.

In the case of a further, particularly advantageous embodiment of the invention, the air conditioner can be operated in a heat pump mode, in which the air which is to be fed to the interior space can be heated by heat which is transmitted or transferred via the heat exchanger from the temperature control fluid which flows through the second temperature control circuit to the refrigerant. As a result, particularly energy-efficient and simple temperature control of the interior space can be provided. The air conditioning device can very preferably also be a compression refrigeration machine or can be operated as a compression refrigeration machine, by which the air which is to be fed to the interior space can be cooled. In the heat pump mode, for example, heat passes from the refrigerant to the air. If the air conditioning device is operated as a compression refrigeration machine, for example, heat passes from the air which is to be fed to the interior space to the refrigerant, as a result of which the air is cooled. As a result, particularly needs-based temperature control of the interior space can be produced in a simple way.

A further embodiment is distinguished by the fact that the air conditioning device has a condenser which is configured for condensing the refrigerant, is therefore arranged in the refrigerant circuit, and is provided in addition to the heat exchanger. This means that the condenser is a second heat exchanger which is provided in addition to the heat exchanger and is external with regard to the heat exchanger, or vice versa. The condenser is arranged in the refrigerant circuit. Moreover, the condenser is arranged in the first temperature control circuit and is connected here in parallel to the drive unit in flow terms. Since the temperature control fluid is preferably a liquid which preferably comprises water, the condenser is therefore a condenser which is flowed through by liquid or is liquid-cooled, in particular is flowed through by water or is water-cooled, via which heat can be exchanged between the refrigerant and the temperature control fluid which flows through the second temperature control circuit, in particular in such a way that heat can be transferred via the condenser from the refrigerant to the temperature control fluid which flows through the second temperature control circuit. As a result, the refrigerant is cooled, and the temperature control fluid is heated. As a result, heat which is transferred to the temperature control fluid can then be utilized, for example, in order to heat the air which is to be fed to the interior space, in particular via the heat exchanger and, in particular, thereupon via the refrigerant. As a result, particularly advantageous and energy-efficient temperature control can be provided.

In order for it to be possible for the temperature control fluid to be conducted in a particularly advantageous and needs-based manner and therefore for particularly simple and advantageous temperature control, in particular of the interior space of the motor vehicle, to be realized, it is provided in a further refinement of the invention that, in the third switching state, the temperature control fluid which flows through the condenser and therefore temperature control fluid which comes from the condenser and flows through the second valve device can be introduced or is introduced by the second valve device into the first part region, arranged downstream of the second valve device, of the first temperature control circuit. It is therefore preferably provided that the second valve device is arranged downstream of the condenser, in particular in the first temperature control circuit, in the flow direction of the temperature control fluid which flows through the first temperature control circuit, the valve device being arranged, in particular, in the first temperature control circuit upstream of the first part region.

In the fourth switching state, the temperature control fluid which flows through the condenser and therefore comes from the condenser and flows through the second valve device can be introduced, for example, by the second valve device into the first part region, arranged downstream of the second valve device, of the first temperature control circuit. As an alternative, it is provided that the temperature control fluid which flows through the condenser and therefore comes from the condenser and flows through the second valve device can be introduced by the second valve device into the second part region, arranged downstream of the second valve device, of the second temperature control circuit and, as a result, into the second temperature control circuit. In other words, it can be provided that, in the fourth switching state, the temperature control circuits are coupled or connected, in particular fluidically, via or by the second valve device in such a way that the temperature control fluid first of all flows through the condenser and therefore, for example, first of all flows through the temperature control circuit and, downstream of the condenser, flows through the second valve device and is conducted by the second valve device into the second part region and therefore into the second temperature control circuit. As a result, particularly simple and needs-based temperature control can be provided.

In order to conduct the temperature control fluid in a particularly simple and needs-based way, it is provided in a further refinement of the invention that the second valve device can be switched into at least one intermediate state, in which the second valve device permits and brings about a flow (throttled with respect to the third switching state and a fourth switching state) of the temperature control fluid through the condenser. In other words, in particular needs-based throttling of the heat exchanger can preferably be realized by the second valve device. To this end, for example, the second valve device can be switched into the at least one intermediate state, in which, for example, the temperature control fluid flows through the heat exchanger 23, but is throttled with respect to the third switching state and with respect to the fourth switching state. Once again in other words, for example in the third switching state and in the fourth switching state, the temperature control fluid (that is to say, for example, a respective first mass flow which is greater than zero of the temperature control fluid) flows through the condenser. In the intermediate state which is a further switching state of the second valve device, the temperature control fluid (that is to say, for example, a respective second mass flow greater than zero of the temperature control fluid) flows through the condenser, the second mass flow being smaller than the first mass flow, however. As a result, needs-based throttling of the condenser can be provided.

Finally, it has been shown to be particularly advantageous if a cooler for cooling the temperature control fluid which flows through the first temperature control circuit is arranged in the first temperature control circuit. In particular, the cooler is an ambient air cooler which is flowed around by the slip stream and therefore by ambient air which forms the slip stream, in particular, during driving, in particular during forward driving, of the motor vehicle. Via the cooler, heat can pass from the temperature control fluid which flows through the cooler to the ambient air which flows around the cooler, as a result of which the temperature control fluid is cooled. As a result, advantageous temperature control can be provided in a simple way.

An optional, additional integration of an, in particular further, cooler which is configured, in particular, as a low temperature cooler ahead of the condenser (that is to say, upstream of the condenser) is also conceivable. In particular, exact throttling of the condenser is conceivable.

A second aspect of the invention relates to a temperature control device for a motor vehicle, with a first temperature control circuit which can be flowed through by a temperature control fluid. The temperature control device comprises at least one drive unit which is arranged in the first temperature control circuit and, as a result, can be temperature controlled by the temperature control fluid which flows through the first temperature control circuit, by which drive unit the motor vehicle can be driven. Moreover, a first pump which is arranged in the first temperature control circuit is provided for conveying the temperature control fluid through the first temperature control circuit. Moreover, the temperature control device comprises a second temperature control circuit which can be flowed through by the temperature control fluid, and at least one electrical energy store which is arranged in the second temperature control circuit and, as a result, can be temperature controlled by the temperature control fluid which flows through the second temperature control circuit, for storing electrical energy. Moreover, the temperature control device comprises a second pump which, in particular, is provided in addition to the first pump, is therefore external with regard to the first pump, and is arranged in the second temperature control circuit. The temperature control fluid can be conveyed through the second temperature control circuit by the second pump.

In order for it then to be possible for particularly advantageous temperature control to be realized, it is provided in the case of the second aspect of the invention that the temperature control device has a valve device which is arranged in the second temperature control circuit and is also arranged in the first temperature control circuit and in the process downstream of the drive unit. The valve device of the second aspect of the invention can be switched over between a first switching state and a second switching state.

In the first switching state of the second aspect of the invention, the temperature control fluid which flows through the drive unit and therefore comes from the drive unit and flows through the valve device of the second aspect of the invention can be introduced by the valve device of the second aspect of the invention into a first part region, arranged downstream of the valve device of the second aspect of the invention, of the first temperature control circuit, with the result that, as it were, the temperature control fluid which flows through the first temperature control circuit upstream of the drive unit remains in the first temperature control circuit even downstream of the drive unit and downstream of the valve device of the second aspect of the invention. In the second switching state of the second aspect of the invention, the temperature control fluid which flows through the drive unit and therefore comes from the drive unit and flows through the valve device of the second aspect of the invention can be introduced by the valve device of the second aspect of the invention into a second part region, arranged downstream of the second valve device, of the second temperature control circuit and, as a result, into the second temperature control circuit. In other words, in the second switching state of the second aspect of the invention, the temperature control circuits are coupled or connected to one another, in particular fluidically, by the valve device of the second aspect of the invention in such a way that the temperature control circuits or at least respective regions, parts or part regions of the temperature control circuits are connected in series to one another in flow terms, or that the temperature control fluid which flows through the first temperature control circuit upstream of the drive unit and thereupon the drive unit and thereupon the valve device of the second aspect of the invention is conducted or introduced after or downstream of the drive unit by the valve device of the second aspect of the invention into the second part region and therefore into the second temperature control circuit, and thereupon flows through the second temperature control circuit, that is to say at least one part of the second temperature control circuit. As a result, the temperature control fluid or heat which is contained in the temperature control fluid and has passed, for example, from the drive unit to the temperature control fluid can be used in a particularly advantageous, needs-based and simple way to control the temperature of the motor vehicle, in particular the interior space of the motor vehicle. Advantages and advantageous refinements of the first aspect of the invention are to be considered to be advantages and advantageous refinements of the second aspect of the invention, and vice versa.

A third aspect of the invention relates to a motor vehicle which is preferably configured as a motor car, in particular as a passenger motor car, which has a temperature control device in accordance with the first aspect and/or in accordance with the second aspect. Advantages and advantageous refinements of the first and second aspects of the invention are to be considered to be advantages and advantageous refinements of the third aspect of the invention, and vice versa.

Further details of the invention result from the following description of preferred exemplary embodiments with the associated drawings.

DETAILED DESCRIPTION

Identical or functionally identical elements are provided with identical designations in the figures.

Figure 1:
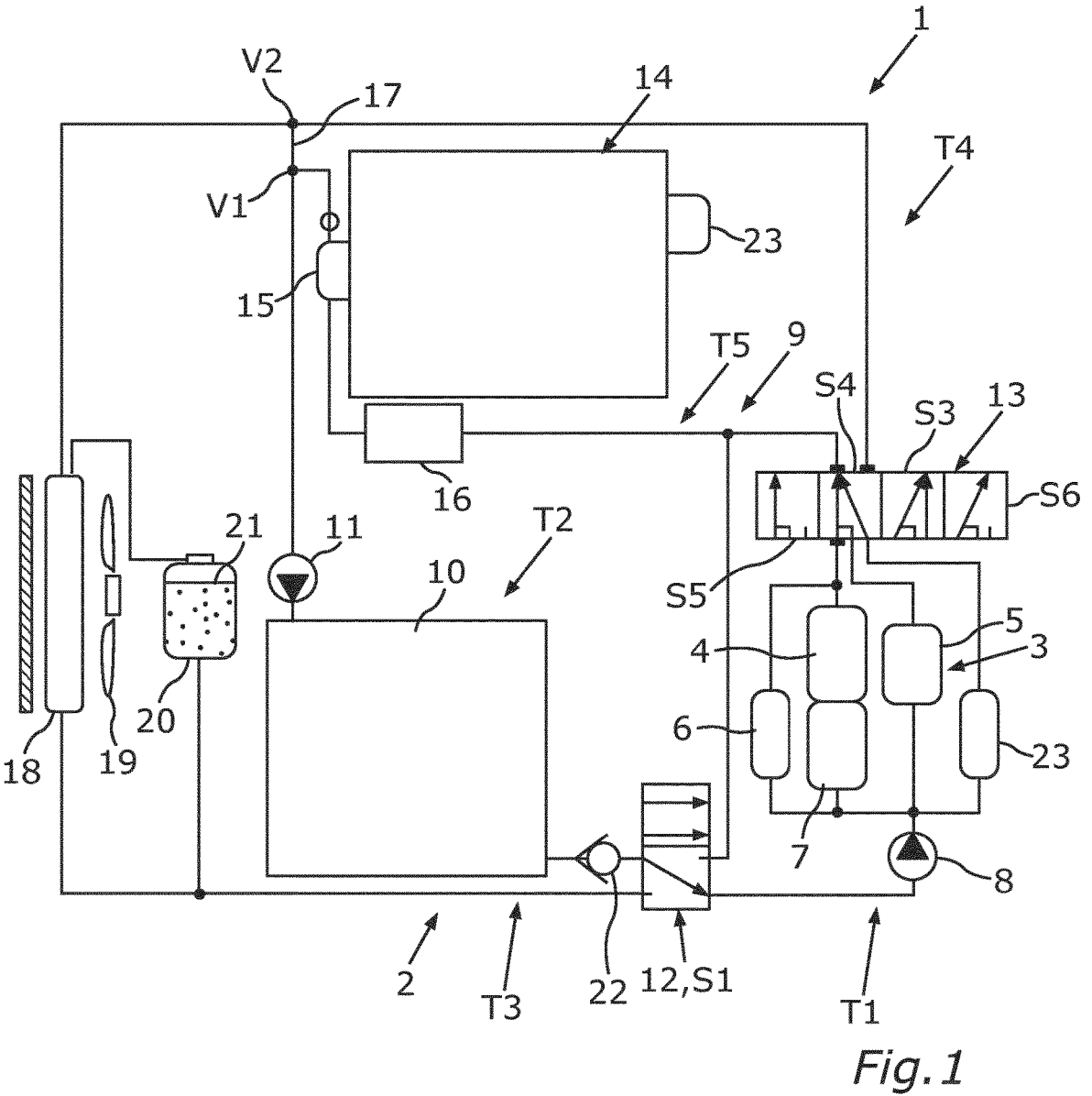
FIG. 1 shows a diagrammatic illustration of a first embodiment of a temperature control device for a motor vehicle, a first valve device of the temperature control device being situated in a first switching state.

FIG. 1 shows a diagrammatic illustration of a first embodiment of a temperature control device 1 of a motor vehicle which is preferably configured as a motor car, in particular as a passenger motor car. The motor vehicle has an interior space which is also called a passenger cell or passenger compartment and in which persons such as, for example, the driver of the motor vehicle can be accommodated during driving of the motor vehicle. The temperature control device 1 has a first temperature control circuit 2 which can be flowed through by a preferably liquid temperature control fluid. A component arrangement 3 which can be flowed through by the temperature control fluid which flows through the first temperature control circuit 2 is arranged in the first temperature control circuit 2, which component arrangement 3 can be temperature controlled, that is to say can be cooled and/or can be heated, by the temperature control fluid which flows through the first temperature control circuit 2. This is to be understood to mean the following, in particular: the component arrangement 3 has a plurality of components which, in particular, are configured separately from one another among one another, are arranged in the first temperature control circuit 2 and accordingly can be flowed through by the temperature control fluid flowing through the first temperature control circuit 2, and therefore can be temperature controlled, that is to say can be cooled and/or can be heated, by the temperature control fluid which flows through the first temperature control circuit 2. A first one of the components of the component arrangement 3 is a drive unit 4, by which the motor vehicle can be driven electrically, in particular purely electrically. For example, the motor vehicle has at least or precisely two axles which are arranged behind one another in the vehicle longitudinal direction and therefore so as to follow one another. The respective axle comprises, for example, at least or precisely two wheels which are also called vehicle wheels and are arranged next to one another in the vehicle transverse direction and on opposite sides of the motor vehicle. The respective wheel is a respective ground contact element, via which the motor vehicle can be supported or is supported in the vehicle vertical direction downward on a roadway. A first one of the axles is a front axle, the wheels of which are also called front wheels. A second one of the axles is a rear axle which is arranged behind the front axle in the vehicle longitudinal direction. The wheels of the rear axle are also called rear wheels. For example, the drive unit 4 is arranged on the rear axle, with the result that the rear wheels can be driven by the drive unit 4 electrically, in particular purely electrically, as a result of which, for example, the motor vehicle can be driven electrically, in particular purely electrically. Therefore, the drive unit 4 is, for example, an electric machine. A second one of the components is, for example, a second drive unit 5 which can be configured as a second electric machine. The drive machine 5 is preferably arranged on the front axle, with the result that the front wheels can be driven by the drive unit 5 electrically, in particular purely electrically. Therefore, the rear wheels can be driven by the drive unit 4, and the front wheels can be driven by the drive unit 5. A third one of the components of the component arrangement 3 is denoted by 6, it being possible, for example, for the component 6 to be a control unit, as a consequence an electric or electronic computing device such as, for example, a battery management system (BMS). A fourth one of the components of the component arrangement 3 is denoted by 7. The component 7 is or comprises, for example, an electronic power system and/or at least one or more electronic computing devices or control units such as, for example, at least one or more battery management systems (BMS). As will be explained more precisely in the following text, the component arrangement 3 is or forms what is known as a heat block which can output or provide heat, it being possible for the interior space of the motor vehicle to be temperature controlled, in particular heated or warmed, particularly advantageously, for example, by the heat which is provided by the heat block. It can be seen that the drive unit 4 and the component 7 are arranged in a first part branch, the component 5 is arranged in a second part branch, and the component 6 is arranged in a third part branch of the temperature control circuit 2. Here, the part branches are connected parallel to one another in flow terms. The drive unit 4 and the component 7 are connected in series to one another in flow terms in the first part branch.

Furthermore, the temperature control device 1 has a first pump 8, by which the temperature control fluid can be conveyed or is conveyed through the first temperature control circuit 2 which is also called the first circuit. Furthermore, the temperature control device 1 has a second temperature control circuit 9 which can be flowed through by the temperature control fluid and is also called the second circuit. The second circuit is what is known as an HVS circuit, as will be explained more precisely in the following text, since an electrical energy store 10 for storing electrical energy is arranged in the second circuit. The drive units 4 and 5 can be supplied with the electrical energy which is stored in the energy store 10 and, as a result, can be operated in a motor mode and therefore as an electric motor, in order to drive the wheels electrically, in particular purely electrically, as a result. Since the components of the component arrangement 3 are arranged in the temperature control circuit 2, the components of the component arrangement 3 can be temperature controlled by the temperature control fluid which flows through the temperature control circuit 2. Since the energy store 10 is arranged in the second temperature control circuit 9 (second circuit), the energy store 10 can be temperature controlled, that is to say cooled and/or heated, by the temperature control fluid which flows through the second temperature control circuit 9, since the second temperature control circuit 9 can be flowed through by the temperature control fluid.

Moreover, the temperature control device 1 has a second pump 11 which is provided in addition to the pump 8 and by which the temperature control fluid can be conveyed through the second temperature control circuit 9. The pumps 8 and 11 are preferably configured as electric pumps, as a consequence as electrically operable pumps.

Figure 2:
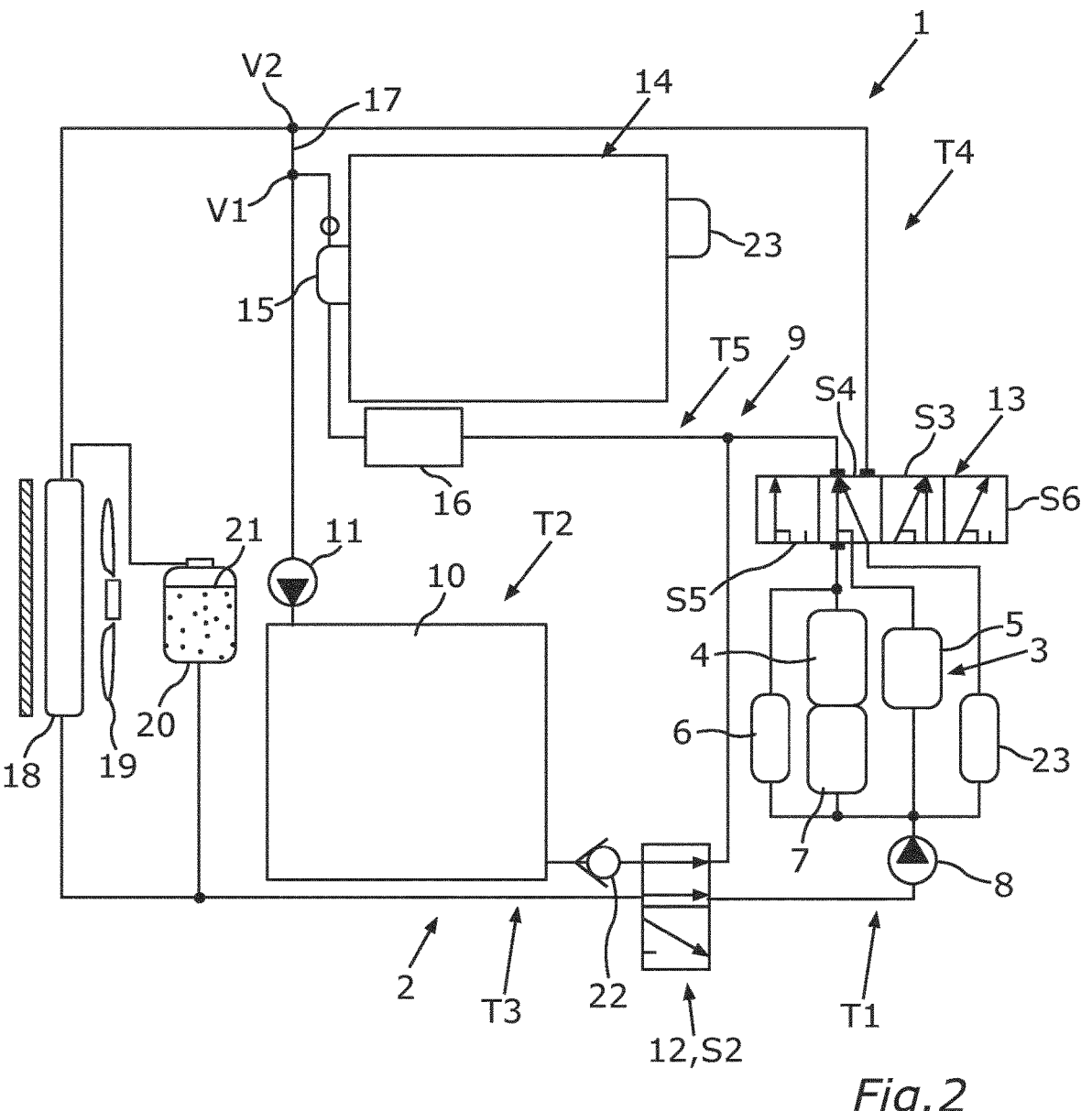
FIG. 2 shows a diagrammatic illustration of the first embodiment of the temperature control device, the valve device being situated in a second switching state.

In order for it then to be possible for particularly advantageous, needs-based and energy-efficient temperature control of the motor vehicle to be realized in a way which is particularly favorable in terms of weight, cost and installation space, the temperature control device 1 has a first valve device 12 which is also called a switch-through valve. The valve device 12 can be switched over, in particular electrically, between a first switching state S1 which is shown in FIG. 1 and a second switching state S2 which is shown in FIG. 2. In the first switching state S1, the pumps 8 and 11 are connected in series to one another. It can be seen from FIG. 1 that the pump 8 is arranged in a first part region T1 of the first circuit, the first part region T1 also being called the first part or the first region of the first circuit. The pump 11 is arranged in a second part region T2 of the second circuit (temperature control circuit 9), the second part region T2 also being called the second part or the second region of the second circuit. It can be seen from FIG. 1 that the circuits, in particular the part regions T1 and T2, are coupled or connected to one another, in particular fluidically, in the first switching state S1 by the valve device 12 in such a way that the part regions T1 and T2 and therefore the pumps 8 and 11 are connected in series to one another, in the case of the first embodiment by way of example in such a way that the part region T1 and therefore the pump 8 are arranged downstream of the part region T2 or the pump 11 in the flow direction of the temperature control fluid which flows through the circuits or the part regions T1 and T2. Therefore, the temperature control fluid flows on its path through the circuits or through the part regions T1 and T2 first of all through the pump 11 or the part region T2 and thereupon through the pump 8 or the part region T1. It can be seen that the energy store 10 is arranged in the part region T2, and that the temperature control fluid flows on its path through the pumps 8 and 11 and through the part regions T1 and T2 first of all through the energy store 10 and thereupon through the pump 8. In the second circuit, the energy store 10 is arranged downstream of the pump 11 and upstream of the valve device 12 in the flow direction of the temperature control fluid which flows through the second circuit, which valve device 12 is arranged upstream of the pump 8 in relation to the first circuit and in the process in the flow direction of the temperature control fluid which flows through the first circuit, and is arranged downstream of the part region T2 and in the process downstream of the pump 11 and, in particular, downstream of the energy store 10 in relation to or in the first switching state S1.

In the second switching state S2, the pumps 8 and 11 are connected in parallel to one another. This is realized, in particular, in such a way that, in the second switching state S2, the circuits, in particular at least the part regions T1 and T2, are disconnected from one another, in particular fluidically, by the valve device 12 in such a way that the temperature control fluid which first of all flows through the pump 11 or the part region T2 and therefore the energy store 10 and comes from the pump 11 and in the present case the energy store 10 or the part region T2 flows to the valve device 12 and flows through the valve device 12, is not conducted by the valve device 12 into the first circuit, but rather remains at least temporarily in the second circuit downstream of the valve device 12. In relation to the first circuit, the circuits are disconnected from one another, in particular fluidically, in the second switching state S2 by the valve device 12 in such a way that the temperature control fluid which first of all flows through the first circuit upstream of the valve device 12 is not conducted on its path through the valve device 12 by the valve device 12 into the second circuit, but rather remains in the second circuit downstream of or after the valve device 12 and thereupon flows through the component arrangement 3.

It can be seen from FIG. 1 that it is provided in the first switching state S1, moreover, that a third part region T3, arranged upstream of the part region T1 and upstream of the valve device 12 in the flow direction of the temperature control fluid which flows through the first circuit, of the first circuit is disconnected by the valve device 12 from the part region T1. In the second switching state, the temperature control fluid flows through the third part region T3, thereupon through the valve device 12 and thereupon through the part region T1 and thereupon through the component arrangement 3.

In the flow direction of the temperature control fluid which flows through the circuits, the valve device 12 is arranged upstream of the first pump 8 in the first circuit and downstream of the second pump 11, in particular downstream of the energy store 10, in the second circuit.

Furthermore, the temperature control device 1 has a second valve device 13 which is provided, in particular, in addition to the valve device 12 and is arranged in the second temperature control circuit 9. Moreover, the valve device 13 is arranged in the first temperature control circuit 2 and in the process downstream of the drive unit 4, in particular downstream of the component arrangement 3. A fourth part region, arranged downstream of the valve device 13 and upstream of the part region T3, of the first circuit is denoted by T4, and a part region, arranged downstream of the valve device 13 and downstream of the valve device 12, of the second circuit is denoted by T5.

The second valve device 13 can be switched over between a third switching state S3 and a fourth switching state S4. In the third switching state S3, the temperature control fluid which flows through the component arrangement 3 and therefore the drive unit 4, comes from the component arrangement 3 and therefore from the drive unit 4, flows toward the valve device 13 and thereupon flows through the valve device 13 can be introduced or is introduced by the second valve device 13 into the part region T4, arranged downstream of the second valve device 13, of the first temperature control circuit 2, with the result that, in the third switching state S3, the temperature control fluid which flows through the component arrangement 3 remains in the first temperature control circuit 2 downstream of the valve device 13 and, in particular, is not introduced into the second circuit.

In the fourth switching state S4, however, the temperature control fluid which flows through the component arrangement 3 and therefore the drive unit 4 and therefore comes from the component arrangement 3 or the drive unit 4, flows toward the valve device 13 and flows through the valve device 13 can be introduced or is introduced by the second valve device 13 into the fifth part region T5, arranged downstream of the second valve device 13, of the second temperature control circuit 9 and therefore into the second temperature control circuit 9. Therefore, for example, the temperature control fluid which flows through the component arrangement 3 and thereupon the valve device 13 does not flow (further) after or downstream of the valve device 13 into the part region T4 and therefore does not flow (further) into the first circuit, but rather is introduced into the part region T5 and therefore into the second circuit, in particular by the valve device 13.

Moreover, the temperature control device 1 has an air conditioning device 14 (shown particularly diagrammatically in FIG. 1), by which air which can be fed or is fed to the interior space of the motor vehicle can be temperature controlled, that is to say can be cooled and/or heated. For example, the air conditioning device 14 can be operated in a compression refrigeration machine mode and therefore as a compression refrigeration machine, by which the air which can be fed to the interior space can be cooled or is cooled. Moreover, it is preferably provided that the air conditioning device 14 can be operated in a heat pump mode and therefore as a heat pump, by which the air which can be fed to the interior space can be heated. The interior space can be cooled by way of cooling of the air which can be fed to the interior space, and the interior space can be heated, that is to say warmed, by way of heating of the air which can be fed to the interior space. The air conditioning device 14 has a refrigerant circuit which is provided in addition to the temperature control circuits 2 and 9, is also called a refrigeration circuit, and can be flowed through by a refrigerant which is provided, in particular, in addition to the temperature control fluid and is different than the temperature control fluid. For example, a refrigerant compressor which is provided in addition to the pumps 8 and 11 and is also simply called a compressor is arranged in the refrigerant circuit, by which refrigerant compressor the refrigerant can be conveyed through the refrigerant circuit and can be compressed. The air conditioning device 14 has a heat exchanger 15 which is also called a chiller, is arranged both in the refrigerant circuit and in the second temperature control circuit 9, and can therefore be flowed through both by the refrigerant and by the temperature control fluid which flows through the second temperature control circuit 9. Via the chiller, heat can be exchanged or transferred between the refrigerant and the temperature control fluid which flows through the second temperature control circuit 9, in particular in such a way that, via the chiller, heat can be transferred from the temperature control fluid which flows through the second circuit to the refrigerant and/or heat can be transferred from the refrigerant to the temperature control fluid which flows through the second circuit.

For example, the air conditioning device 14 has an evaporator which is provided in addition to the chiller for evaporating the refrigerant, the evaporator being arranged in the refrigerant circuit. Moreover, the air conditioning device 14 preferably comprises a second heat exchanger which is provided in addition to the chiller and in addition to the evaporator and is also called a condenser and is configured for condensing the refrigerant. Therefore, the condenser (second heat exchanger) is arranged in the refrigerant circuit.

The temperature control device 1 makes it possible to realize what is known as a heating case in a way which is particularly favorable in terms of weight, cost and installation space and is energy-efficient, it being possible in or as a result of the heating case for both the interior space and the energy store 10 to be particularly advantageously heated, and as a consequence brought to an advantageously high temperature, in a way which is energy-efficient and favorable in terms of cost, weight and installation space. Heat which passes from the component arrangement 3 to the temperature control fluid can be introduced into the second circuit (HVS circuit), in particular in or as a result of the switching state S4, since the temperature control fluid, by which the component arrangement 3 is cooled, is introduced into the second circuit by the valve device 13 in the fourth switching state S4. The heat which is contained in the temperature control fluid can then firstly be transferred, for example, via the heat exchanger 15 (chiller) to the refrigerant, as a result of which the refrigerant is heated. For example in the heat pump mode and/or via the condenser, the air which can be fed to the interior space can be heated, in particular in such a way that heat which is contained in the refrigerant and is contained in the refrigerant by virtue of the fact that the heat which is contained in the temperature control fluid has been transferred to the refrigerant via the chiller, is transferred in the heat pump mode and/or via the condenser to the air which is fed to the interior space and, as a consequence, is introduced into the interior space. Moreover, for example, the temperature control fluid which has flowed through and, as a result, has cooled the component arrangement 3 and thereupon has been introduced by the valve device 13, in particular in the switching state S4, into the part region T5 and therefore into the second circuit, can, in particular after or downstream of the heat exchanger 15, flow through the part region T2 or the pump 11 and, in particular, the electrical energy store 10 and can therefore emit heat to the energy store 10 and can heat the energy store 10 as a result.

A heating element 16 which can be configured, for example, as an electrical flow heater (EDH) is arranged in the second circuit, in particular in the part region T5, in particular downstream of the valve device 13 and upstream of the heat exchanger 15. It is noted explicitly that the heating element 16 can be dispensed with. The heating element 16 is preferably an electric heating element and, as a consequence, can be operated electrically, with the result that the temperature control fluid can be heated electrically via a heating element 16, in particular, on its path to the heat exchanger 15, in particular from the valve device 13 and/or also the energy store 10. As a consequence, the interior space and the energy store 10 can be heated in a needs-based manner, in particular, via the chiller. Since the electrical energy store 10 is arranged in the second circuit, and since the energy store 10 is configured as a battery and/or as a high voltage component, the second circuit is also called a battery circuit or a high voltage storage circuit (HVS circuit). It can be seen overall that the heat block (component arrangement 3) can be utilized as a heat source for the battery circuit and preferably also for the interior space.

It can be seen in FIG. 1 that the circuits are connectable or can be connected to one another fluidically via at least or precisely one connecting line 17, the connecting line 17 being connected or connectable fluidically at a connecting point V1 to the second circuit and at a connecting point V2 to the second circuit. The connecting point V1 is arranged in the second circuit downstream of the heat exchanger 15 and upstream of the pump 11 and therefore upstream of the energy store 10, and the connecting point V2 is arranged in the first circuit downstream of the valve device 13 and upstream of the valve device 12, in particular upstream of a cooler 18 which is arranged in the first circuit. The temperature control fluid which flows through the first circuit and in the process the cooler 18 can be cooled by the cooler 18. In particular in the heating case, that is to say in order to heat the battery circuit and/or the interior space, the temperature control fluid bypasses the cooler 18 which is configured, in particular, as a high temperature cooler (HT cooler), in particular in such a way that, on its path through the second circuit, the temperature control fluid bypasses the cooler 18 completely or at least predominantly, that is to say completely or at least predominantly does not flow through the cooler 18.

The cooler 18 is assigned an, in particular, electrically operable fan 19, by which air can be conveyed which flows around the cooler 18 when it is conveyed by the fan 19. As a result, the temperature control fluid which flows through the cooler 18 can be cooled effectively via the cooler 18.

It is preferably provided that the two pumps 8 and 11 are active in the first switching state S1, that is to say the two pumps 8 and 11 convey the temperature control fluid, in particular at the same time, as a result of which excessive cavitation can be avoided. Since the pumps 8 and 11 are connected in parallel to one another in the second switching state S2, each pump 8 and 11 has to convey the temperature control fluid only through its respective, dedicated circuit, with the result that the respective pump 8 and 11 can be configured to be favorable in terms of installation space, weight and cost.

Moreover, the temperature control device 1 has an equalizing container 20, in which a quantity 21 of the temperature control fluid is received, in order for it to be possible as a result for volume and/or quantity fluctuations of the temperature control fluid in the circuits to be compensated for. Moreover, an element such as, for example, a check valve 22 can optionally be arranged in the second circuit, which element is arranged downstream of the pump 11, in particular downstream of the energy store 10, and upstream of the valve device 12 in the case of the first embodiment. As a result, an undesired backflow of the temperature control fluid into the battery circuit or at least a part of the battery circuit can be avoided.

The abovementioned second heat exchanger, preferably configured or acting as a condenser, of the air conditioning device 14 and is denoted by 23. It can be seen that the second heat exchanger 23 which is preferably configured for condensing the refrigerant and is provided in addition to the heat exchanger 15 is arranged in the refrigerant circuit. Moreover, the heat exchanger 23 is arranged in the first circuit (first temperature control circuit 2) and in the process is connected parallel to the component arrangement 3 and therefore to the drive unit 4. It can be seen from FIG. 1 that, in the third switching state S3, the temperature control fluid which flows through the heat exchanger 23 and therefore comes from the heat exchanger 23 and also flows through the valve device 13 is introduced by the second valve device 13 into the part region T4, arranged downstream of the second valve device 13, of the first circuit, with the result that the temperature control fluid which first of all flows through the part region T1 and thereupon the heat exchanger 23 and thereupon the valve device 13 remains in the first circuit. It is provided in the case of the first embodiment that, in the fourth switching state S4, the temperature control fluid which flows through the heat exchanger 23 is introduced by the second valve device 13 into the part region T5 which is arranged downstream of the second valve device 13 and therefore into the second circuit. In the third switching state S3, a flow of the temperature control fluid which flows through the heat exchanger 23 is prevented into the part region T5 by the valve device 13 and, in the switching state S4, a flow of the temperature control fluid which flows through the heat exchanger 23 is avoided into the part region T4 by the valve device 13.

The valve device 13 can also be moved or switched into a fifth switching state S5 and into a sixth switching state S6. In the fifth switching state S5, the temperature control fluid which flows through the component arrangement 3 and therefore the drive unit 4 is conducted by the valve device 13 into the part region T5 and therefore into the second circuit, while a flow of the temperature control fluid which flows through the heat exchanger 23 is prevented by the valve device 13 both in the first circuit and in the second circuit, that is to say both in the part region T4 and in the part region T5. In the sixth switching state S6, the temperature control fluid which flows through the component arrangement 3 and therefore the drive unit 4 is conducted by the valve device 13 into the part region T4, while a flow of the temperature control fluid which flows through the heat exchanger 23 is prevented by the valve device 13 both in the part region T4 and in the part region T5.

In the case of the first embodiment, for example, the valve device 13 is switching valve, in particular a single switching valve, the switching valve having, for example, a housing and at least or precisely one valve element which is arranged in the housing and can be moved relative to the housing, in particular in a translational and/or rotational manner, which valve element can be moved relative to the housing into respective switching positions which bring about the respective switching states S3, S4, S5 and S6.

Figure 3:
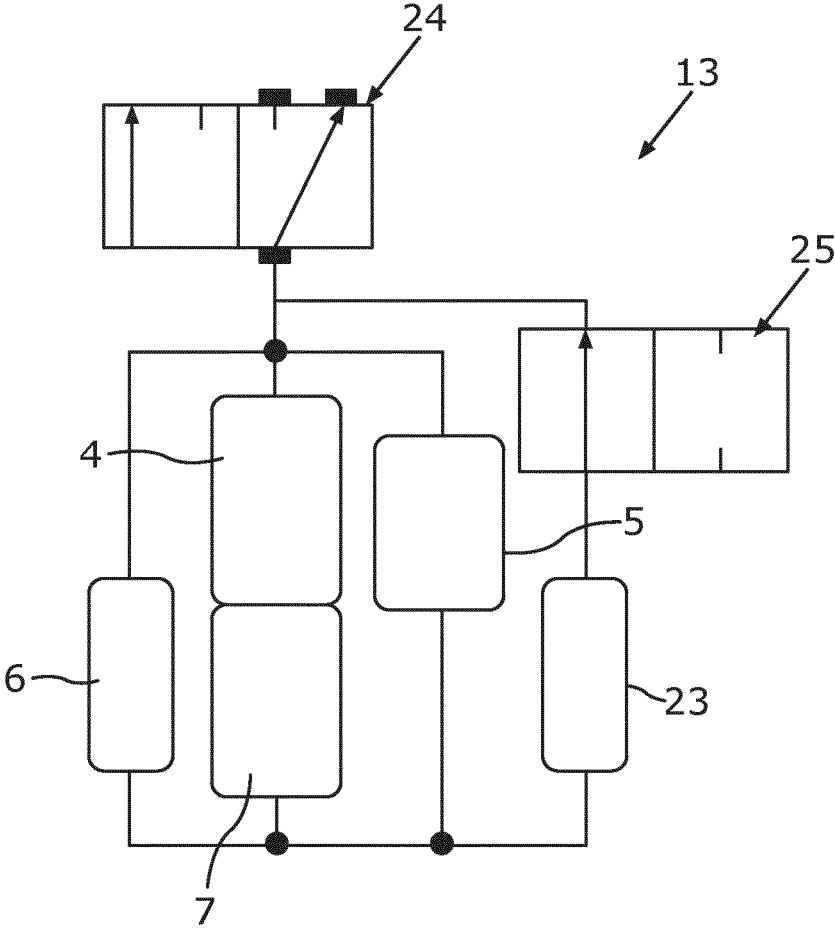
FIG. 3 shows details of a diagrammatic illustration of a second embodiment of the temperature control device.

FIG. 3 shows a second embodiment of the temperature control device 1. In the case of the second embodiment, the valve device 13 comprises two separate valves 24 and 25. In other words, in the case of the second embodiment, the valve device 13 is formed by way of two separate valves 24 and 25, the valve 24 being provided in addition to the valve 25 and being an external component with regard to the valve 25, and vice versa. The respective valve 24 or 25 comprises, for example, a respective, dedicated valve housing and a respective, dedicated valve element which can be moved relative to the respective, dedicated valve housing, in order to realize the different switching states S3, S4, S5 and S6 of the valve device 13 as a result. In particular, the valve 24 is a switching valve or is also called a switching valve. Furthermore, the valve 25 is, for example, a throttle valve or is also called a throttle valve.

In particular, throttling of the heat exchanger 23 which is, in particular, needs-based can be realized by the valve device 13, very particularly by the valve 25. To this end, for example, the valve device 13, in particular the valve 25, can be switched into at least one intermediate state, in which, for example, the temperature control fluid flows through the heat exchanger 23, but is throttled with respect to the switching states S3 and S4. In other words, for example, it is prevented in the switching states S5 and S6 that the temperature control fluid flows through the heat exchanger. In the switching states S3 and S4, the temperature control fluid, that is to say, for example, a respective, first mass flow greater than zero of the temperature control fluid, flows through the heat exchanger 23. In the intermediate state which is a further switching state of the valve device 13, the temperature control fluid, that is to say, for example, a respective, second mass flow greater than zero of the temperature control fluid, flows through the heat exchanger 23, the second mass flow being smaller than the first mass flow, however. As a result, needs-based throttling of the heat exchanger 23 can be provided.

Figure 4:
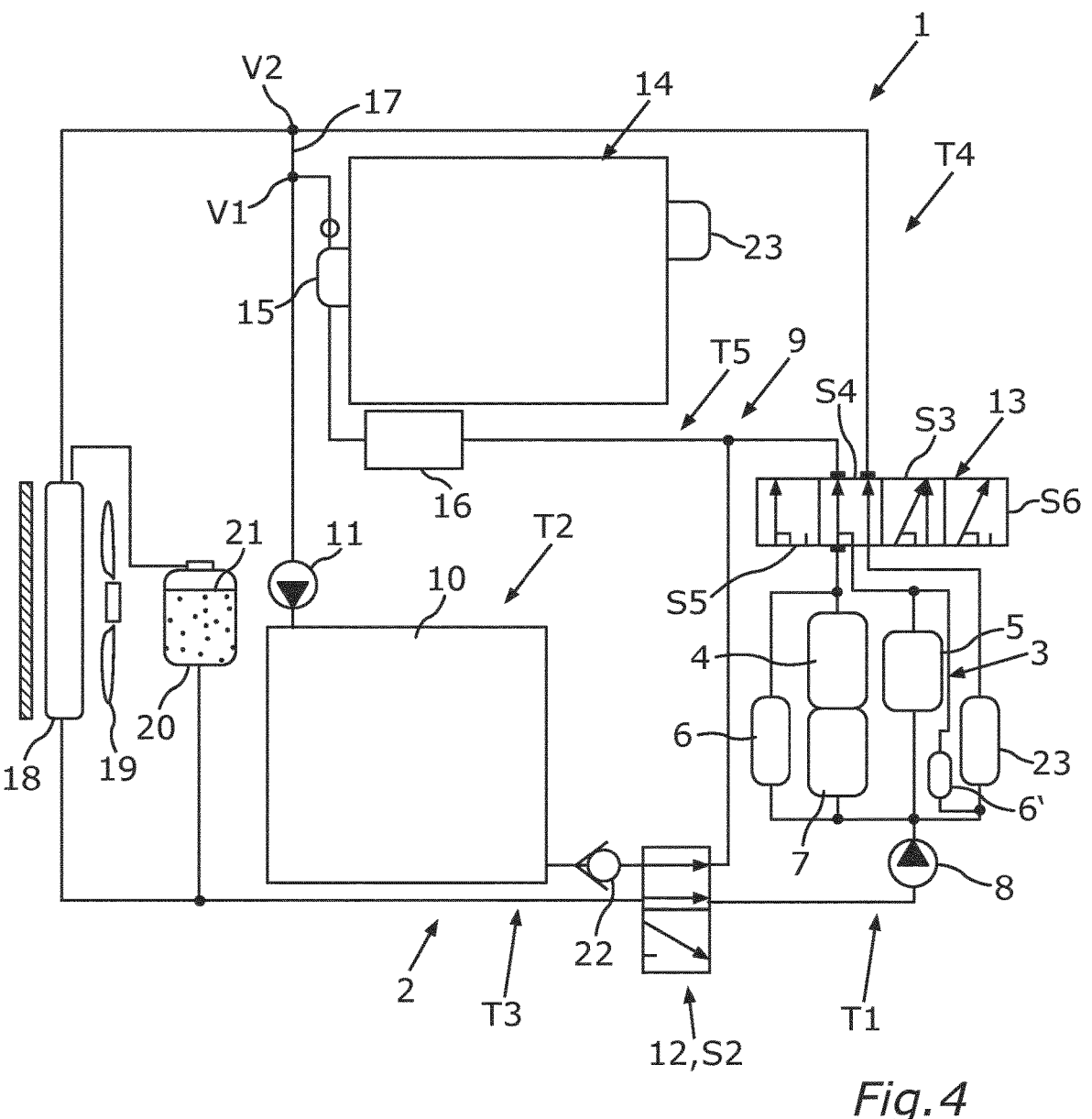
FIG. 4 shows a diagrammatic illustration of a third embodiment of the temperature control device.

FIG. 4 shows a diagrammatic illustration of a third embodiment of the temperature control device 1. The third embodiment differs, in particular, from the first and second embodiments by virtue of the fact that, in the fourth switching state S4, the temperature control fluid which flows through the heat exchanger 23 is conducted by the second valve device 13 into the part region T4 and therefore remains in the first circuit, while the temperature control fluid which flows through the component arrangement 3 and therefore the drive unit 4 is conducted by the valve device 13 into the part region T5 and therefore into the second circuit 9. Moreover, it is provided in the case of the third embodiment that the pump 8 is arranged upstream of the valve device 12 in the first circuit. In the case of the third embodiment, as shown in the case of the first embodiment and, in particular, in FIG. 1, a check valve 22 or another element which prevents a backflow can optionally be arranged in the temperature control circuit 2 and in the process downstream of the energy store 10 and upstream of the valve device 12, a backflow of the temperature control fluid from the valve device 12 toward the energy store 10 being avoidable or avoided by the check valve 22 or by the element, and the element or the check valve 22 permitting or making a flow of the temperature control fluid in the opposite direction possible, that is to say from the energy store 10 to the valve device 12. As an alternative, the check valve 22 might be arranged in the energy store 10 or in its store housing. The check valve 22 would then be arranged, for example, downstream of storage cells of the energy store 10, the storage cells of which are arranged in the store housing. The electrical energy can be stored by the storage cells; for example, the storage cells can be temperature controlled by the temperature control fluid which flows through the temperature control circuit 2.

FIG. 4 also shows a component 6' which can be provided in addition to or as an alternative to the component 6 and can be a constituent part of the component arrangement 3. In particular, the valve device 13 is or acts as a switching and throttle valve.

Figure 5:
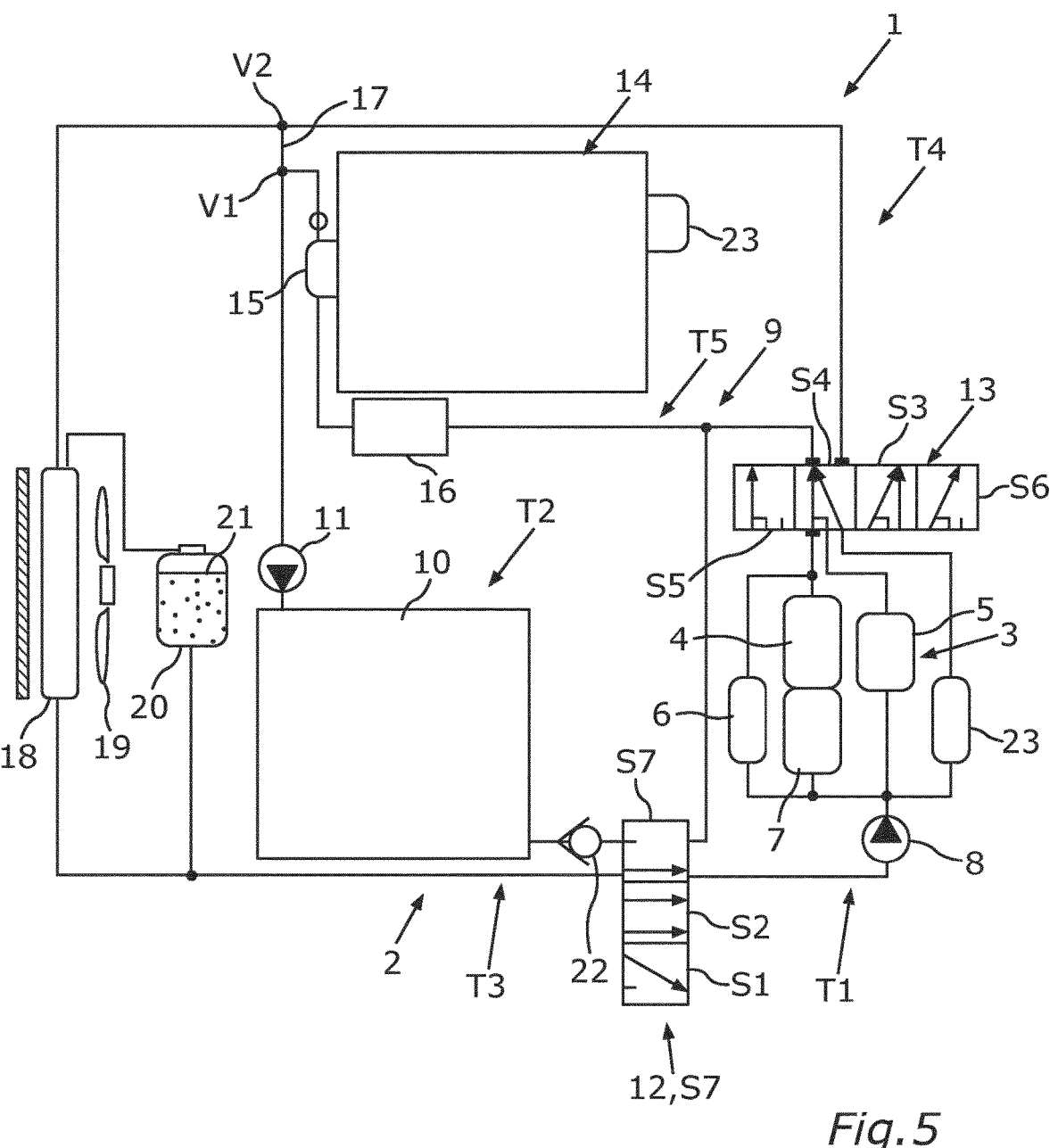
FIG. 5 shows a diagrammatic illustration of a fourth embodiment of the temperature control device.

FIG. 5 shows a fourth embodiment of the temperature control device 1. In the case of the fourth embodiment, the valve device 12 can be moved into a seventh switching state S7, in which the part region T3 is connected fluidically to the part region T1 by or via the valve device 12. In this regard, the switching state S7 corresponds to the switching state S2, but with the difference that, in the switching state S7, the part region T2 is disconnected from the part region T5 in such a way that the valve device 12 prevents a flow of the temperature control fluid from the part region T2 to and into the part region T5, or vice versa. As a result, in particular, an undesired backflow of the temperature control fluid into the battery circuit, in particular from the part region T5 into the part region T2, can be avoided, as a result of which, for example, the check valve 22 can be dispensed with without losing its function. In other words, the check valve 22 or its function is realized by way of the valve device 12 or the switching state S7. If the switching state S7 is dispensed with, for example, the check valve 22 can advantageously be provided.

The preceding and following comments with respect to the drive unit 4 can also be transferred to the drive unit 5, and vice versa. This means, in particular, that, in the respective switching state S3, S4, S5 or S6, the temperature control fluid which flows through the drive unit 5 is conducted by the valve device 13 to the location or into the part region T4 or T5, in which the temperature control fluid which flows through the drive unit 4 is also conducted or guided by the valve device 13. In relation to the switching state S4, this means, for example, that both the temperature control fluid which flows through the drive unit 4 and the temperature control fluid which flows through the drive unit 5 are conducted by the valve device 13 in the switching state S4 into the part region T5 and therefore into the second circuit. In relation to the third switching state S3, both the temperature control fluid which flows through the drive unit 4 and the temperature control fluid which flows to the drive unit 5 are conducted by the valve device 13 into the part region T4.

Furthermore, in the case of the valve device 13, it is provided by way of example, that is to say optionally, but particularly advantageously, that precisely or at least one of the switching states S3, S4, S5 and S6 or some of the switching states S3, S4, S5 and S6 or all or the switching states S3, S4, S5 and S6 are assigned a respective intermediate state which is also called a mixing state. Here, for example, the valve element of the valve device 13 can be moved into a respective intermediate position which brings about the respective intermediate state, in particular relative to the valve housing of the valve device 13. It is provided in the respective intermediate state, for example, that the temperature control fluid which flows through the drive unit 5 is conducted by the valve device 13 to the location or into the part region T4 or T5, in which the temperature control fluid which flows through the drive unit 5 is also conducted by the valve device 13 in the respective switching state S3, S4, S5 or S6 which is assigned the respective switching state, but is throttled with respect to the respective switching state S3, S4, S5 or S6 which is assigned the respective intermediate state. In other words, it is preferably provided that, in the respective intermediate state, respective throttling of the temperature control fluid which flows through the drive unit 5 and, as a consequence, the valve device 13 takes place with respect to the respective switching state S3, S4, S5 or S6 which is assigned to the respective intermediate state, that is to say is brought about by the valve device 13. As an alternative, it is conceivable that, in the respective intermediate state, the temperature control fluid which flows through the drive unit 5 is shut off by the valve device 13. This is to be understood to mean, in particular, that it is provided, for example, that, in the respective intermediate state, the valve device 13 prevents the temperature control fluid which flows through the drive unit 5 from flowing from the drive unit 5 into the part region T4 or T5, in which the temperature control fluid which flows through the drive unit 4 flows via the valve device 13. It is preferably also provided that, in the respective intermediate state, the valve device 13 also prevents the temperature control fluid which flows through the drive unit 5 from flowing from the drive machine 5 into the corresponding other part region T5 or T4. This can also be applied correspondingly or analogously to the heat exchanger 23, in particular in such a way that, in at least one of the switching states S3, S4, S5 and S6, in particular, for example, in the switching state S5 and/or S6 and/or in at least one, some or all of the intermediate states and/or in at least one or further intermediate states, throttling or shutting off of the temperature control fluid which flows through the heat exchanger 23 and flows into the respective part region T4 or T5 takes place, that is to say is brought about by the valve device 13, in particular with respect to at least one or more or all of the switching states S3, S4, S5 and S6, in particular with respect to the switching states S3 and S4.

Figure 6:
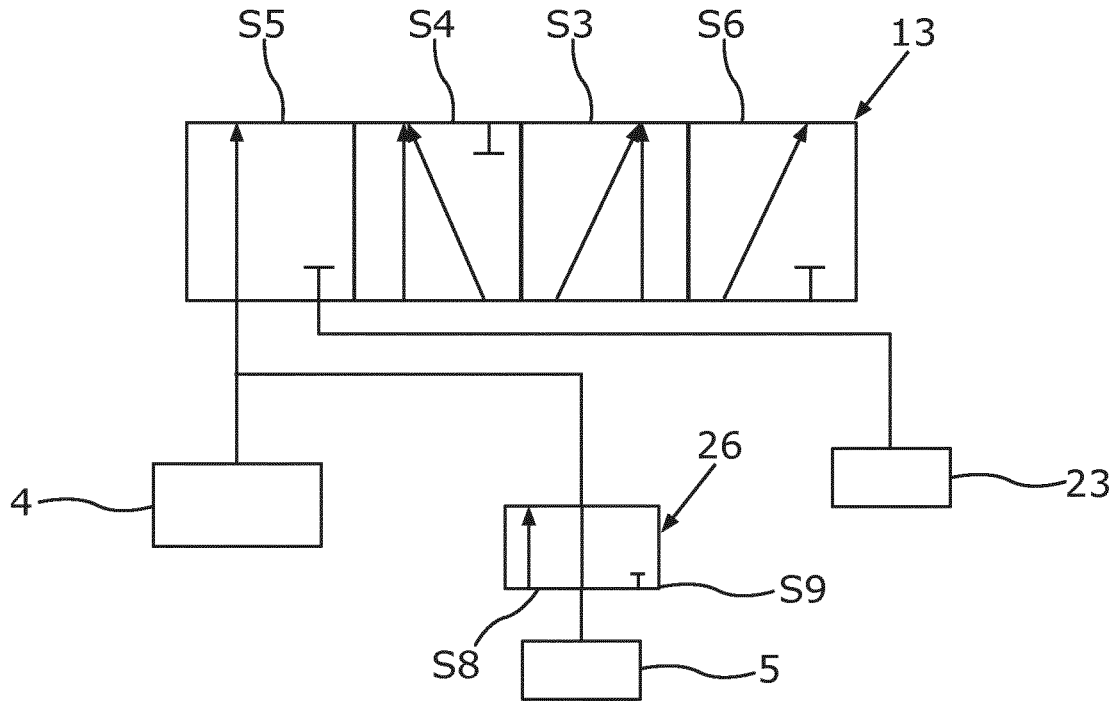
FIG. 6 shows details of a diagrammatic illustration of a fifth embodiment of the temperature control device.

FIG. 6 shows a fifth embodiment of the temperature control device 1. In particular, the fifth embodiment can be an alternative to or an enhancement of the third embodiment. In the case of the fifth embodiment, for example, no throttling of the drive unit 5 or the temperature control fluid which flows through the drive unit 5 is provided. Here, a valve 26 which is preferably provided in addition to the valve device 13 is provided, in particular, which is assigned to the drive unit 5, for example, and is therefore a dedicated valve of the drive unit 5, for example. It can be seen that the valve 26 is arranged in a path which is flowed through by the temperature control fluid and by which the temperature control fluid can be conducted from the drive unit 5 to the valve device 13 and therefore runs between the drive unit 5 and the valve device 13. Here, the valve 26 is arranged in the path and downstream of the drive unit 5 and upstream of the valve device 13, and can be switched over between an eighth switching state S8 and a ninth switching state S9. In the eighth switching state S8, the valve 26 releases the path and makes a flow of the temperature control fluid possible from the drive unit 5 via the path and in the process via the valve 26 to the valve device 13. In the ninth switching state S9, the path is shut off by way of the valve 26, as a result of which a flow of the temperature control fluid from the drive unit 5 via the path to the valve device 13 is avoided. In particular, the valve device 13 can be adjusted between its switching states S3 to S6, while the valve 26 remains in its switching state S8. Furthermore, the valve device 13 can be adjusted between its switching states S3 to S6, while the valve 26 remains in its switching state S9. As a result, needs-based conducting of the temperature control fluid can be provided.

For example, throttling which is needs-based of the heat exchanger 23 takes place, for example, in the intermediate state between the switching states S4 and S5 and/or in the intermediate state between the switching states S3 and S6, in particular as described above with respect to FIG. 3.

Figure 7:
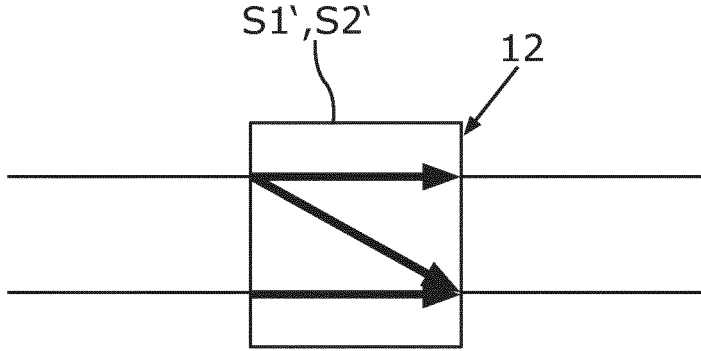
FIG. 7 shows details of a diagrammatic illustration of one embodiment of the first valve device.

It can be seen from FIG. 7 that the switching state S1 and/or S2 can be assigned a respective intermediate state S1' or S2' of the valve device 12, the respective intermediate state S1' or S2' also being called a respective mixing state of the valve device 12. For example, the valve device 12 has a single valve part which can be moved into respective further switching positions which bring about the respective switching states S1, S2 or into respective intermediate or mixing positions which bring about the respective mixing states of the valve device 12, in particular relative to a valve housing of the valve device 12. For example, in the respective mixing position of the valve device 12, both at least one part of the temperature control fluid is conducted out of the energy store 10 and the valve is also conducted out of the part region T3 into the part region T1, a further part of the temperature control fluid being conducted, in particular, out of the energy store 10 while bypassing the component arrangement 3 and the valve device 13 into the part region T5.

Figure 8:
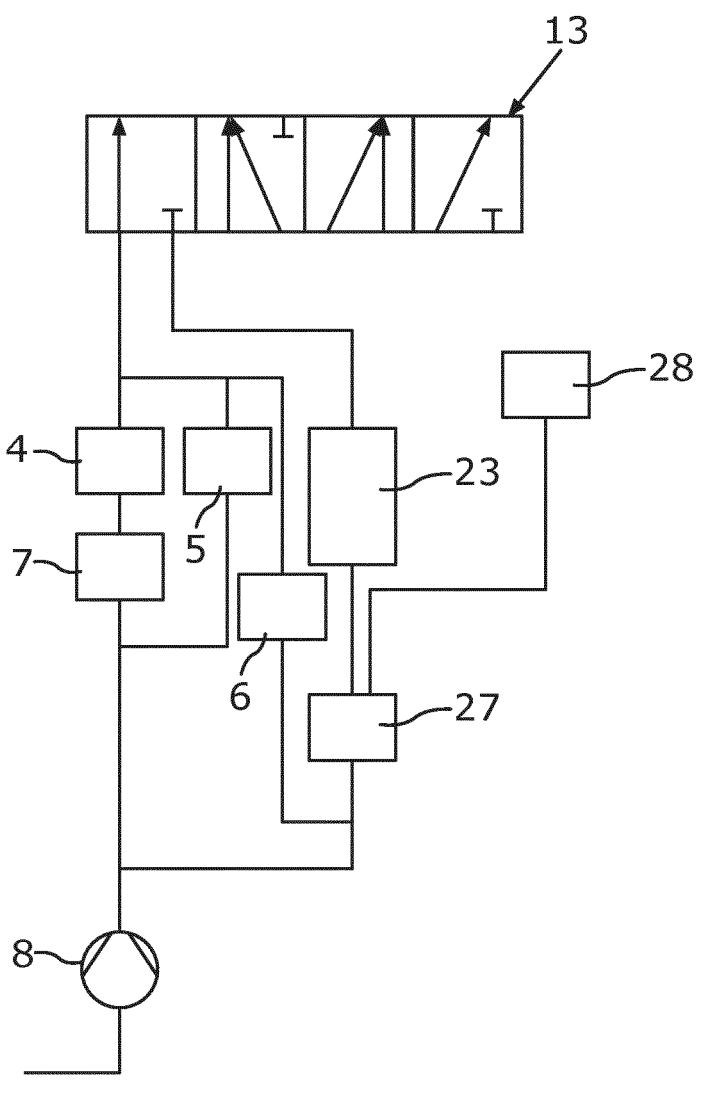
FIG. 8 shows details of a diagrammatic illustration of a sixth embodiment of the temperature control device.

Finally, FIG. 8 shows details of a sixth embodiment of the temperature control device 1. Here, a branch is provided which is arranged or connected parallel to the component 6 in flow terms, can be flowed through by the temperature control fluid, and in which the heat exchanger 23 and, upstream of the heat exchanger 23, a cooler 27 which is configured, in particular, as a low temperature cooler are arranged. Moreover, an equalizing container 28 which, for example, is also assigned to a or the high temperature cooler is provided connected, in particular, downstream of the cooler 27 and preferably parallel to the heat exchanger 23 in flow terms.

LIST OF DESIGNATIONS

1 Temperature control device
2 First temperature control circuit
3 Component arrangement
4 Drive unit
5 Drive unit
6 Component
6' Component
7 Component
8 First pump
9 Second temperature control circuit
10 Electrical energy store
11 Second pump
12 First valve device
13 Second valve device
14 Air conditioning device
15 Heat exchanger
16 Heating element
17 Connecting line
18 Cooler
19 Fan
20 Equalizing container
21 Quantity
22 Check valve
23 Heat exchanger
24 Valve
25 Valve
26 Valve
27 Cooler
28 Equalizing container
S1 First switching state
S1' Intermediate state
S2 Second switching state
S2' Intermediate state
S3 Third switching state
S4 Fourth switching state
S5 Fifth switching state
S6 Sixth switching state
S7 Seventh switching state
S8 Eighth switching state
S9 Ninth switching state
T1 Part region
T2 Part region
T3 Part region
T4 Part region
T5 Part region
V1 Connecting point
V2 Connecting point

The invention claimed is:

1. A temperature control device for a motor vehicle, comprising:

a first temperature control circuit through which a temperature control fluid can flow;

at least one drive unit, by which the motor vehicle is driven and which is arranged in the first temperature control circuit and, as a result, is temperature controlled by the temperature control fluid which flows through the first temperature control circuit;

a first pump which is arranged in the first temperature control circuit and is configured to convey the temperature control fluid through the first temperature control circuit;

a second temperature control circuit through which the temperature control fluid flows;

at least one electrical energy store which is arranged in the second temperature control circuit and, as a result, is temperature controlled by the temperature control fluid which flows through the second temperature control circuit, and is configured to store electrical energy;

a second pump which is arranged in the second temperature control circuit and is configured to convey the temperature control fluid through the second temperature control circuit; and a valve device configured to be switched over between:

a first switching state, in which the first and second pumps are connected in series to one another, and a second switching state, in which the first and second pumps are connected in parallel to one another, wherein, in a flow direction of the temperature control fluid which flows through the first and second temperature control circuits, the valve device is arranged upstream of the first pump in the first temperature control circuit and downstream of the second pump in the second temperature control circuit, and is not located in a flow path through which the temperature control fluid from the first pump flows in the flow direction to the at least one drive unit.

2. The temperature control device according to claim 1, comprising:

a second valve device which is arranged in the second temperature control circuit and in the first temperature control circuit downstream of the drive unit, and is configured to be switched over between:

a third switching state, in which the temperature control fluid which flows through the drive unit is introduced by the second valve device into a first part region, arranged downstream of the second valve device, of the first temperature control circuit, and a fourth switching state, in which the temperature control fluid which flows through the drive unit is introduced by the second valve device into a second part region, arranged downstream of the second valve device, of the second temperature control circuit and, as a result, into the second temperature control circuit.

3. The temperature control device according to claim 1, comprising:

an air conditioner which is configured to temperature control air which is to be fed to an interior compartment of the motor vehicle, which air conditioning device comprises:

a refrigerant circuit which is provided in addition to the first and second temperature control circuits, and through which a refrigerant flows; and at least one heat exchanger which is arranged in the refrigerant circuit and in the second temperature control circuit, and via which heat can be transferred between the refrigerant and the temperature control fluid which flows through the second temperature control circuit.

4. The temperature control device according to claim 3, wherein the air conditioning device is configured to be operated in a heat pump mode, in which the air which is to be fed to the interior compartment is heated by heat which is transferred to the refrigerant via the heat exchanger from the temperature control fluid which flows through the second temperature control circuit.

5. The temperature control device according to claim 3, wherein the air conditioning device comprises a condenser which is configured to condense the refrigerant, and which is provided in addition to the heat exchanger, and which is arranged in the refrigerant circuit, the condenser also being arranged in the first temperature control circuit and being connected in parallel to the drive unit.

6. The temperature control device according to claim 5, comprising:

a second valve device which is arranged in the second temperature control circuit and in the first temperature control circuit downstream of the drive unit, and is configured to be switched over between a third switching state and a fourth switching state, wherein, in the third switching state:

the temperature control fluid which flows through the condenser is introduced by the second valve device into a first part region, arranged downstream of the second valve device, of the first temperature control circuit, and wherein, in the fourth switching state:

the temperature control fluid which flows through the condenser is introduced by the second valve device into the first part region, arranged downstream of the second valve device, of the first temperature control circuit, or the temperature control fluid which flows through the condenser is introduced by the second valve device into a second part region, arranged downstream of the second valve device of the second temperature control circuit.

7. The temperature control device according to claim 6, wherein the second valve device is switched into at least one intermediate state, in which the second valve device permits a flow of the temperature control fluid through the condenser, which flow is throttled with respect to the third switching state and the fourth switching state.

8. The temperature control device according to claim 1, wherein a cooler for cooling the temperature control fluid which flows through the first temperature control circuit is arranged in the first temperature control circuit.

9. A motor vehicle, comprising:

the temperature control device according to claim 1.

10. The temperature control device according to claim 1, wherein, in the flow direction, the temperature control fluid which flows through the first pump thereafter flows through the at least one drive unit prior to subsequently flowing through the valve device.

11. The temperature control device according to claim 1, wherein, in the flow direction of the temperature control fluid which flows through the first and second temperature control circuits, the valve device is arranged immediately upstream of the first pump in the first temperature control circuit.

12. A temperature control device for a motor vehicle, comprising:

a first temperature control circuit through which a temperature control fluid flows;

at least one drive unit, by which the motor vehicle is driven and which is arranged in the first temperature control circuit and, as a result, is temperature controlled by the temperature control fluid which flows through the first temperature control circuit;

a first pump which is arranged in the first temperature control circuit and is configured to convey the temperature control fluid through the first temperature control circuit;

a second temperature control circuit through which the temperature control fluid flows;

at least one electrical energy store which is arranged in the second temperature control circuit and, as a result, is temperature controlled by the temperature control fluid which flows through the second temperature control circuit, and is configured to store electrical energy;

a second pump which is arranged in the second temperature control circuit and is configured to convey the temperature control fluid through the second temperature control circuit;

a valve device which is arranged in the second temperature control circuit and in the first temperature control circuit downstream of the drive unit, and is configured to be switched over between:

a first switching state, in which the temperature control fluid which flows through the drive unit is introduced by the valve device into a first part region, arranged downstream of the valve device, of the first temperature control circuit, and a second switching state, in which the temperature control fluid which flows through the drive unit is introduced by the valve device into a second part region, arranged downstream of the valve device, of the second temperature control circuit and, as a result, into the second temperature control circuit; and an air conditioner which is configured to temperature control air which is to be fed to an interior compartment of the motor vehicle, which air conditioning device comprises:

a refrigerant circuit which is provided in addition to the first and second temperature control circuits, and through which a refrigerant flows;

at least one heat exchanger which is arranged in the refrigerant circuit and in the second temperature control circuit, and via which heat can be transferred between the refrigerant and the temperature control fluid which flows through the second temperature control circuit; and a condenser which is configured to condense the refrigerant, and which is provided in addition to the heat exchanger, and which is arranged in the refrigerant circuit, the condenser also being arranged in the first temperature control circuit and being connected in parallel to the drive unit.

13. A motor vehicle, comprising:

the temperature control device according to claim 12.

14. The temperature control device according to claim 12, wherein, in the first switching state:

the temperature control fluid which flows through the condenser is introduced by the valve device into the first part region, and wherein, in the second switching state:

the temperature control fluid which flows through the condenser is introduced by the valve device into the first part region, or the temperature control fluid which flows through the condenser is introduced by the valve device into the second part region.

\* \* \* \* \*